United States Patent [19]

Finney et al.

[11] Patent Number: 4,697,340

[45] Date of Patent: Oct. 6, 1987

[54] METHOD OF MANUFACTURING A CARRIER ASSEMBLY

[75] Inventors: James E. Finney, Aldershot, England; Weldon L. Brubaker, Lisle, Ill.

[73] Assignee: Molex Incorporated, Lisle, Ill.

[21] Appl. No.: 789,680

[22] Filed: Oct. 21, 1985

Related U.S. Application Data

[62] Division of Ser. No. 613,949, May 25, 1984.

[30] Foreign Application Priority Data

Jun. 3, 1983 [GB] United Kingdom ................ 8315211

[51] Int. Cl.[4] .................... H01R 43/04; B21D 39/00; B23P 11/00; B29C 65/00

[52] U.S. Cl. ........................................ 29/862; 29/450; 29/522 R; 29/509; 29/882; 206/329; 206/330; 206/820; 264/249

[58] Field of Search .................... 29/522 R, 858, 863, 29/883, 882, 631, 450; 264/249; 206/329, 346, 347, 338, 343, 345, 820, 340, 330

[56] References Cited

U.S. PATENT DOCUMENTS

| | | | |
|---|---|---|---|
| 1,514,618 | 11/1924 | Dde | 206/330 X |
| 2,815,124 | 12/1957 | Pellier | 206/330 |
| 2,884,150 | 4/1959 | Weichselbaum et al. | 206/820 X |
| 2,966,618 | 12/1960 | Lehner | 206/330 X |
| 3,227,270 | 1/1966 | Floyd, Jr. | 206/338 |
| 3,361,251 | 1/1968 | Olsson | 206/330 |
| 3,431,548 | 3/1969 | Busler | 206/330 X |
| 3,968,873 | 7/1976 | Pomeroy et al. | 206/345 X |
| 4,033,456 | 7/1977 | Wion et al. | 206/347 |
| 4,159,767 | 7/1979 | Jesme et al. | 206/343 |
| 4,301,921 | 11/1981 | Petuch | 206/820 X |
| 4,380,291 | 4/1983 | Shannon | 206/343 |
| 4,395,087 | 7/1983 | Gorre et al. | 206/343 X |
| 4,442,938 | 4/1984 | Murphy | 206/329 |
| 4,489,830 | 12/1984 | Charlebois et al. | 206/329 X |

*Primary Examiner*—Charlie T. Moon
*Attorney, Agent, or Firm*—Louis A. Hecht; John W. Cornell

[57] ABSTRACT

A method of manufacturing a carrier assembly including a carrier strip with a plurality of modular telephone plug connectors secured thereto. Each connector has a housing with a tag integrally molded therewith and secured to the strip. The strip has a plurality of holes which receive projections extending from the tags. The projections interengage with the strip to secure the housings thereto.

The method of manufacturing the carrier assembly described above which includes the steps of integrally molding a tag with a projection onto each of the housings; punching holes in the strip; locating a projection through a corresponding hole; and securing the projection to its corresponding hole.

4 Claims, 5 Drawing Figures

METHOD OF MANUFACTURING A CARRIER ASSEMBLY

This application is a division of application Ser. No. 613,949, filed May 25, 1984.

BACKGROUND OF INVENTION

1. Field of the Invention

This invention is concerned with a method of manufacturing a carrier assembly which includes plug connectors for use in telecommunications.

2. Brief Description of the Prior Art

Modular telephone plugs or connectors are used extensively in telecommunications to allow flexibility of use of telephones as well as other data transmissive equipment. A number of sockets are provided, around for example a house, and the telephone is provided with a short cable terminating in a plug assembly thus allowing the telephone to be plugged into the most convenient socket for use.

The plugs are typically small molded bodies which define a cavity in which the end of the telephone cable is located, a smaller cavity or cavities in the stripped core ends are placed and metal terminals, one for each core, which can make contact both with the core ends and with cooperating terminals in a socket. In manufacture, the bodies are molded by conventional means and have the terminals fitted therein. The plugs are supplied in loose form to the user who takes the individual assemblies and fits them on the ends of the telephone cables.

SUMMARY OF THE INVENTION

It is an object of the present invention to provide a method of manufacturing small molded articles that provides the articles to the user in a more convenient form.

The present invention is a method of manufacturing a carrier assembly including a generally continuous carrier strip having a plurality of molded articles secured thereto, said method including the steps of integrally molding a tag onto each of said articles, said tag including a projection extending therefrom; punching a plurality of spaced-apart holes on said carrier strip; locating each projection through a corresponding hole; and securing the projection to its corresponding hole.

DESCRIPTION OF THE DRAWINGS

Embodiments of the present invention will now be described, by way of example, with reference to the accompanying drawings, in which.

DESCRIPTION OF THE PREFERRED EMBODIMENT

Figure 1:
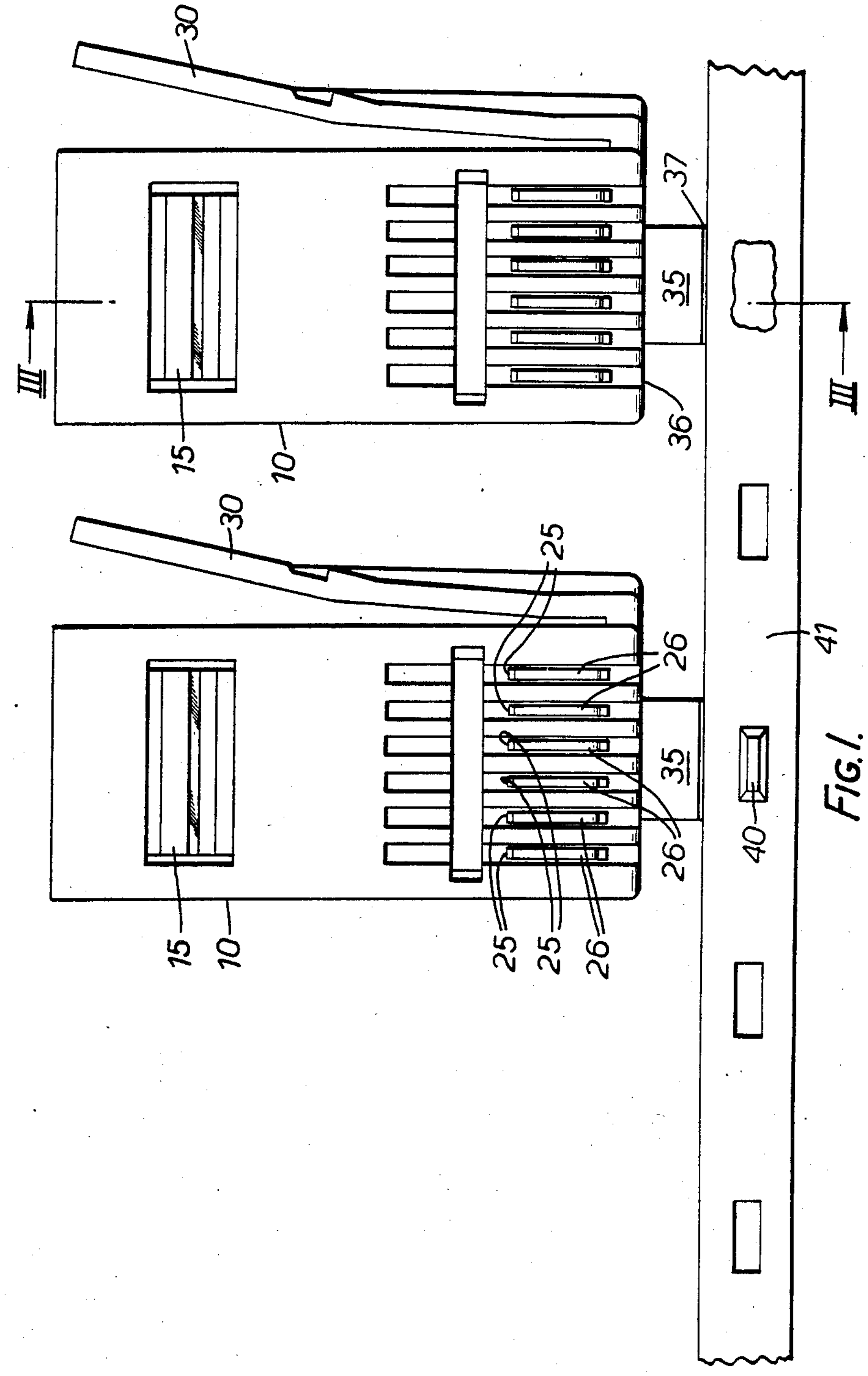
FIG. 1 is a plan view of two telephone plug connectors in combination with a carrier strip.
Figure 2:
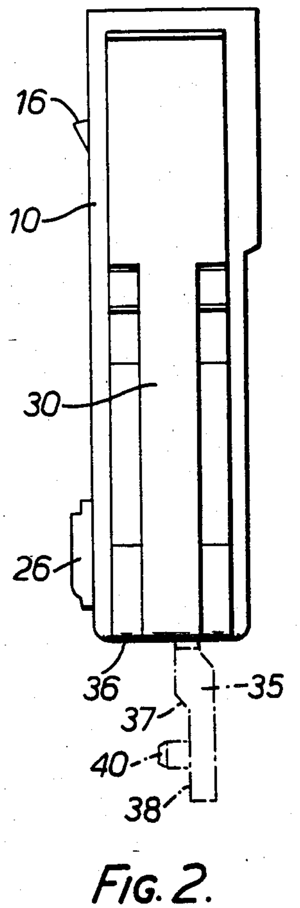
FIG. 2 is a side elevation of the combination of FIG. 1.
Figure 3:
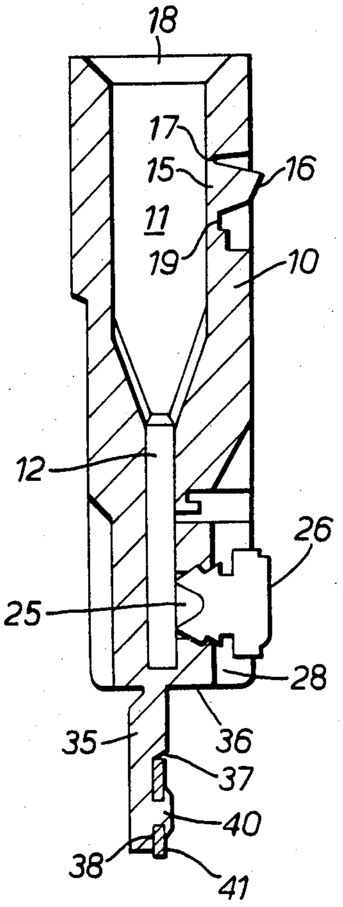
FIG. 3 is a section on the line III—III of FIG. 1.

Referring now to the drawings, and in particular FIG. 3, a well known modular telephone plug connector comprises a molded insulated plastic housing or body 10 having a first large cable receiving cavity 11 for receiving the end of a telephone cable and a number, in this embodiment six, of smaller conductor receiving cavities 12 opening from the end of the cable receiving cavity 11 for receiving the stripped cores of the cable.

A tag 15 for locking the cable in position in the cable receiving cavity 11 is provided in the upper surface of the housing 10 and comprises a portion of the housing which is provided with a nose 16 and is secured to the adjacent body portions by a frangible strip or break line 17 on the side adjacent the open end 18 of the cavity 11 and a hing strip 19 on the other side. When the cable end is inserted into the cavity 11, pressure on the nose 16 breaks the strip 17 and the tag 15 pivoting on the hing strip 19 can be pushed into the cable receiving cavity 11, compressing and deforming the cable end, until the nose 16 locks beneath the edge of the broken strip 17 providing a suitable strain relief.

Terminal receiving cavities in the form of slots 25 are also provided in the upper surface of the body 10, one slot communicating with each of the conductor receiving cavities 12. Metal terminals 26 are located one in each slot 25 and are shown in FIG. 3 in the position in which they leave the manufacturer, i.e. they do not penetrate into the conductor receiving cavities 12. The user, having inserted the cable end into the cavity 11 and the stripped core ends into the cavities 12, forces the terminals inwardly so that they make contact with the cores while still being accessible to cooperating socket contacts by virtue of channels 28 in the housing 10, the channels being aligned with the slots 25.

At one side of the housing 10 of each plug assembly is provided a flexible locking arm 30 which cooperates with a socket to retain the plug therein.

It should be understood that as so far described the plug assemblies are well known.

In accordance with the present invention, each connector or plug assembly has molded integrally with the body or housing 10 thereof a tag 35 at the closed end 36 of the body. Each tag 35 consists of a thin strip having a frangible break line where it joins the housing 10 and has an upper surface stepped down at 37 to provide a top surface 38 on the thinner end of the tag 35. In the middle of this top surface 38 is provided a projection or post 40.

After the housing has been molded by any normal molding process, the individual housings are placed in an automatic feeder and delivered serially for attachment to an aluminum strip 41 which has holes 42 punched along its centerline. The projections 40 of bodies are located in alternate holes 42 in the strip 41 and then are moved with the strip to a mechanical staking machine where the tips of the posts projecting through the holes in the strip 41 are turned over and deformed to provide a positive attachment of the housings 10 and the strip 41. Instead of a mechanical staking machine, an ultrasonic welder or a heat staking machine may be used.

It should be noted that the edge of the strip 41 is engaged by the steps 37 of the housings 10 to provide firm support therefor. In a modified embodiment, this support can be further enhanced by providing recesses in the edge of the strip 41 at the holes 42, the recesses embracing the unstepped inner portions of the tags 35.

After securement of the housings 10, the strip 41 is supplied to a stitching machine where the terminals are supplied and fitted in the slots 25. As the housings 10 are now supported on the strip 41, their presentation to the stitching machine is greatly simplified and the alternate free holes in the strip can be used by an indexing mechanism further aiding the stitching operation.

After the terminals are in position, the strip 41 together with its associated connectors or plugs is coiled or reeled for shipment to the users. When the user comes to fit the connectors to cable ends the operation is again much simpler because of the uniform orientation of the connectors on the strip 41. When a connector has been fitted to its cable it is then removed from the strip 41 by breaking the frangible break line on the tag 35.

Figure 4:
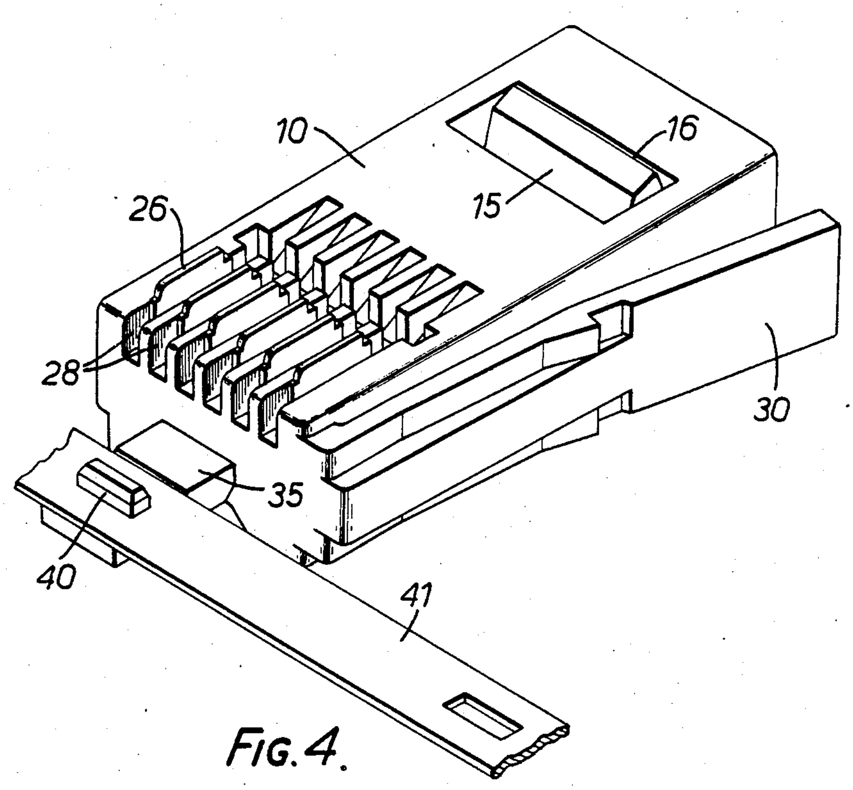
FIG. 4 is a perspective view of a plug as shown in FIG. 1 in combination with a carrier strip to form the carrier assembly of the present invention.
Figure 5:
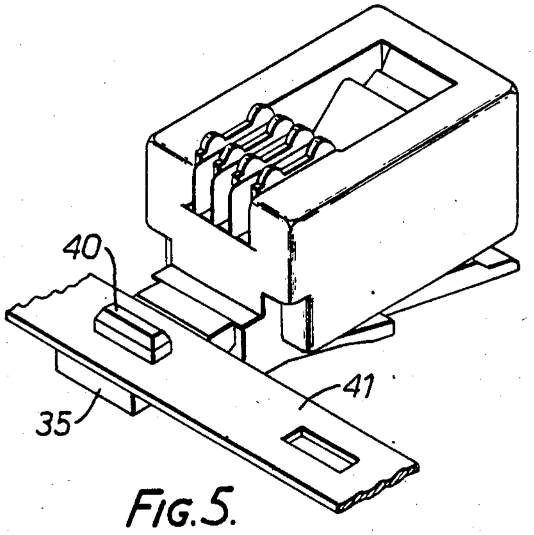
FIG. 5 is a perspective view similar to FIG. 4 but showing a different plug connector.

FIG. 4 is a perspective view of a connector on the aluminum strip 41 and FIG. 5 is a perspective view of a connector of different design but using the same tag 35 and strip 41.

While the invention has been described in relation to modular telephone plug connectors it may also be used in relation to any small molded component otherwise handled singly and may indeed be applicable to small components in general.

In a further modification of the present invention, the strip is indexed past a molding machine which molds the bodies and simultaneously effects their attachment to the strip, i.e. the bodies are molded in place on the strip.

We claim:

1. A method for manufacturing a carrier assembly for molded thermoplastic articles, said carrier assembly comprising a generally continuous carrier strip having a plurality of spaced-apart molded articles secured thereto in uniform orientation, said carrier strip being separate from said article and said carrier assembly being adapted to be coiled or reeled for shipment or in use, said method comprising the steps of:

(a) integrally molding each of said thermoplastic articles with a tag thereon, said tag including a projection extending therefrom;

(b) providing a separate generally continuous carrier strip adapted to be coiled or reeled;

(c) punching a plurality of spaced-apart holes in said carrier strip;

(d) locating each projection through a corresponding hole in said carrier strip; and (e) thereafter securing the projection to its corresponding hole by plastically deforming said projection onto said strip.

2. The method of claim 1 wherein said securing step includes plastically deforming the end of the projection so that the end is larger than the hole.

3. The method of claim 2 wherein said deforming step includes heat staking, mechanical staking or ultrasonic welding.

4. The method of claim 1 wherein said molded article is a connector housing made of insulating material which includes at least one terminal receiving cavity therein, said method further including mounting an electrical terminal in said cavity.

* * * * *